United States Patent
Millikan et al.

(10) Patent No.: US 7,042,813 B2
(45) Date of Patent: May 9, 2006

(54) SHOCK PROTECTION FOR COMPRESSED AUDIO ON A CD PLAYER

(75) Inventors: Thomas N. Millikan, Austin, TX (US); Sreenivas Kothandaraman, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 385 days.

(21) Appl. No.: 10/256,467

(22) Filed: Sep. 27, 2002

(65) Prior Publication Data
US 2003/0210617 A1 Nov. 13, 2003

Related U.S. Application Data

(60) Provisional application No. 60/378,001, filed on May 13, 2002.

(51) Int. Cl.
*G11B 21/12* (2006.01)
(52) U.S. Cl. .................. 369/30.23; 369/47.33
(58) Field of Classification Search ............. 369/30.23, 369/47.33; G11B 21/12, 20/10
See application file for complete search history.

(56) References Cited

U.S. PATENT DOCUMENTS

| | | | | |
|---|---|---|---|---|
| 5,410,525 A | * | 4/1995 | Yokota | 369/30.23 |
| 5,508,983 A | * | 4/1996 | Nakamura et al. | 369/47.31 |
| 5,553,055 A | * | 9/1996 | Yokota et al. | 369/124.08 |
| 5,621,712 A | * | 4/1997 | Nonaka | 369/124.14 |
| 5,745,645 A | * | 4/1998 | Nakamura et al. | 386/131 |
| 5,790,484 A | * | 8/1998 | Maeda et al. | 711/4 |
| 5,818,801 A | * | 10/1998 | Watanabe et al. | 369/30.23 |
| 5,995,462 A | * | 11/1999 | Harold-Barry | 369/53.18 |
| 6,101,329 A | * | 8/2000 | Graef | 710/52 |
| 6,292,440 B1 | * | 9/2001 | Lee | 369/7 |
| 6,345,028 B1 | * | 2/2002 | Jaeger | 369/84 |
| 6,477,123 B1 | * | 11/2002 | Hutter | 369/47.32 |
| 6,621,777 B1 | * | 9/2003 | Lee | 369/47.24 |
| 6,791,481 B1 | * | 9/2004 | Altare et al. | 341/55 |
| 6,804,178 B1 | * | 10/2004 | Tada et al. | 369/30.23 |
| 6,847,593 B1 | * | 1/2005 | Millikan et al. | 369/30.23 |

FOREIGN PATENT DOCUMENTS

EP 0507571 A2 * 7/1992

* cited by examiner

*Primary Examiner*—Aristotelis M. Psitos
(74) *Attorney, Agent, or Firm*—Robert D. Marshall, Jr.; W. James Brady, III; Frederick J. Telecky, Jr.

(57) ABSTRACT

A media player permits multiple compressed media files to be concurrently stored in memory interval to the media player. By concurrently buffering more than one compressed media file at a time, any mechanical disturbance that occurs during the playing of a file or between files will not cause a cessation of audio. Further, skipping ahead or in reverse is advantageously expedited.

18 Claims, 3 Drawing Sheets

SHOCK PROTECTION FOR COMPRESSED AUDIO ON A CD PLAYER

CROSS-REFERENCE TO RELATED APPLICATIONS

This application claims priority under 35 USC §119(e)(1) of Provisional Application No. 60/378,001, filed May 13, 2002.

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to a compact disk ("CD") player. More particularly, the invention relates to shock protection for a CD player. Still more particularly, the invention relates to shock protection for a CD player that plays audio from a CD containing compressed audio data (e.g., MP3).

2. Background of the Invention

Audio electronics have long included portable devices that permit the user to listen to music or other types of audio. Examples of such devices include battery operated cassette tape players. More recently, compact disk ("CD") audio players have become extremely popular. A CD disk comprises a relatively flat, round disk that is approximately 4.5 inches in diameter. The information stored on a CD disk is stored in a digital format, not analog as for the larger vinyl records used in conjunction with record players.

CDs have several advantages over records. For example, many audiophiles believe the audio quality from a CD is superior to that of records. Further, CDs are smaller than records. Further still, unlike records which are relatively fragile and must be kept clean, CDs are less fragile and susceptible to dirt and other contaminants. Also, CDs can be played using battery operated CD players, whereas records cannot be played in this fashion.

The information stored on a CD is accessed by rotating the CD under a laser beam. The laser is used to read the bits encoded on the CD. Accordingly, most or all CD players, portable or not, have a mechanism to rotate the CD with respect to the laser. When accessing songs from a CD, no device actually touches the rotating CD unlike the stylus that touches the surface of a rotating record. For this reason, CD players are less susceptible to vibrations and other disturbances than are record players. Nevertheless, CD players are not completely immune from shock and vibration. A significant enough jolt to a CD player that is playing a song can cause a disruption in the laser's ability to access the digital data on the CD, thereby causing a temporary cessation of music.

One approach to solving this problem is through the use of a solid state memory buffer. Data is read from the CD and stored in the buffer which is large enough to hold at least several seconds (or tens of seconds, or more) of audio. Audio data is retrieved from the buffer, converted to an analog format and played back through speakers (e.g., headphones) connected to the CD player. If the CD player experiences a jolt, the mechanism reading the disk may be disturbed momentarily, but that mechanical disturbance does not cause an interruption to the purely electronic process of retrieving data from the buffer and playing it through the speakers. Thus, the player buffers ahead of the point in the song that is being played. This type of "shock protection" is currently available in some models of conventional CD audio players.

Buffering ahead between songs is generally easy and straightforward. Tracks on a conventional CD audio disk are generally arranged contiguously. That is, the end of one track is immediately adjacent the beginning of the next track. Thus, a conventional CD audio player having a shock protection buffer simply needs to inform the "CD loader" (which is the mechanism that moves the laser to the appropriate place on the disk) the track number from which to begin playing. From that point on, audio data is read from the CD and placed into the shock buffer and, because the tracks are arranged end-to-end, the process of buffering ahead can easily continue into the next song.

Conventional CD audio disks contain audio in an uncompressed digital format. Recently, the desire to place more songs on a single CD disk has lead to the development of CD "burners" (devices that store information on a disk) which store audio information in a compressed format. A particularly popular format in use today is the "MP3" standard. Because each song is compressed, an MP3-based CD disk can hold many more songs than conventional, uncompressed audio disks.

As with conventional CD audio disks, the desire is also present to guard against mechanical disturbances while playing MP3 disks. Some MP3 players may have a form of shock protection which guards against mechanical disturbances during a song. However, no MP3 player is known to exist which includes shock protection to guard against disturbances which occur between songs. It is generally known and believed that once an MP3 player finishes playing a song, the MP3 player begins searching for and loading the next song. If a shock or vibration occurs before the MP3 player has any, or much, of the next song buffered up, there will be a delay before the next song can begin to play while the player waits for the mechanical disturbance to subside and begin or continue buffering the next song. MP3 players known to exist today do not provide shock protection to ensure the continuous playing of the next song once the current song finishes.

Conventional MP3 players also are generally only capable of keeping track of and playing one song at a time. That is, such an MP3 player retrieves compressed audio data from the disk and stores it in an internal memory buffer, but only does so for the current song being played. Once the current song is finished playing, at that time the player determines the location on the disk of the next song to be played and begins buffering that song. Although generally acceptable, this process can result in an annoyingly long time between songs while the player's laser is repositioned to the beginning of the next song on the disk. Further, skipping ahead to the next song or back to the beginning of a previous song is fairly slow because the next song or previous song is not present in the player's memory buffer. Instead, the player will have to move the laser head to begin retrieving the desired data from the next/previous song. A solution to this problem also is desirable.

BRIEF SUMMARY OF THE PREFERRED EMBODIMENTS OF THE INVENTION

The preferred embodiments of the present invention solve the problems noted above by providing a media player that permits multiple compressed media files to be concurrently stored in memory interval to the media player. By concurrently buffering more than one compressed media file at a time, any mechanical disturbance that occurs during the playing of a file or between files will not cause a cessation of audio. Further, skipping ahead or in reverse is advantageously expedited.

In accordance with a preferred embodiment, the media comprises a compressed audio player that includes a processor coupled to memory, input controls, an output display, a speaker, and a media device containing a plurality of compressed audio files. The files may be MP3, or other files and the media device may be a CD or a solid state memory device. The processor includes a block decoder, an MP3 decoder and file management logic. The file management logic preferably includes a set of pointers pertaining to each compressed audio file being buffered in the memory. The pointers, and various status flags, permit the processor to keep track of a plurality of buffered files as well as permit forward and reverse skipping.

These and other aspects of the present invention will become apparent upon analyzing the drawings, detailed description and claims, which follow.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, processor and computer companies may refer to a component and sub-components by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either a direct or indirect electrical connection. Thus, if a first device couples to a second device, that connection may be through a direct electrical connection, or through an indirect electrical connection via other devices and connections. To the extent that any term is not specially defined in this specification, the intent is that the term is to be given its plain and ordinary meaning.

DETAILED DESCRIPTION OF THE PREFERRED EMBODIMENTS

Figure 1:
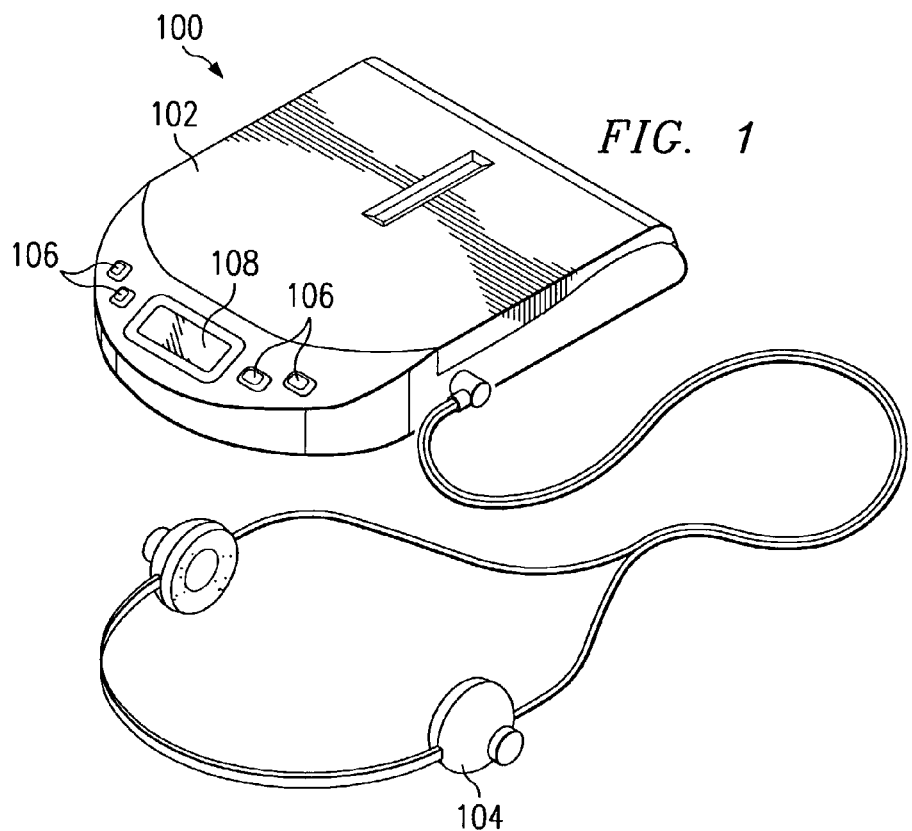
FIG. 1 shows a portable CD player which plays compressed audio files and which avoids the effects of mechanical disturbances between audio tracks constructed in accordance with a preferred embodiment of the invention.

Referring to FIG. 1, in accordance with a preferred embodiment of the invention, a compressed audio CD player system 100 comprises a disk drive and control mechanism 102 coupled to a speaker unit 104, which preferably comprises a pair of headphones. The player system 100 plays compressed audio files from a disk in the disk drive and control mechanism 102. The compressed audio files may contain music, speech, in general, any type of audio content. The compressed audio files may be in accordance with the MP3 standard or any other suitable compression standard. There are numerous other embodiments of the invention such as a non-portable player typical of home use. Further, the player system 100 may use solid state memory to store the compressed audio files rather than a CD.

The compressed audio CD player 100 advantageously can store and keep track of more than one compressed audio file at a time thereby reducing the dead time in between files in which a conventional compressed audio CD player would have to locate and begin buffering the next song. Instead, the preferred player 100 begins buffering the next file before the current file has finished playing and, in general, buffers ahead as many songs as possible given the size of the memory buffer (not shown in FIG. 1) internal to the player. The player 100 also permits forward and reverse "skipping" which entails jumping immediately to the beginning of the next song to be played or to the beginning of the current song or a previous song. The compressed audio CD player 100 implements skipping while maintaining multiple songs such that the player does not necessarily need to retrieve the next/previous song from the disk itself. Instead, the next/previous song advantageously may already be stored in the player's internal memory. This expedites skipping and minimizes the dead time between songs while a conventional player would have to reposition its laser beam.

Figure 2:
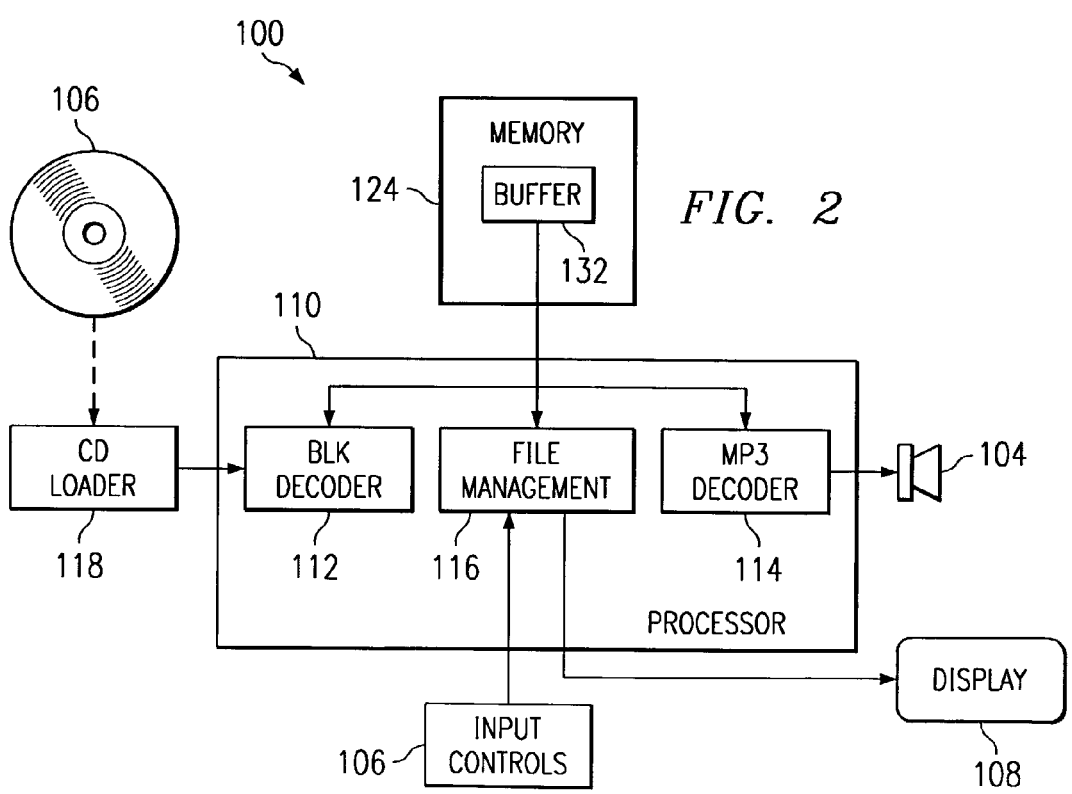
FIG. 2 is a block diagram of the portable CD player of FIG. 1.

FIG. 2 shows a more detailed block diagram of one exemplary embodiment of the player 100. Referring to FIG. 2, player 100 includes CD loader 118, a processor 110, memory 124, speaker 104, input controls 106 and display 108. The memory 124, which preferably comprises a suitable type of random access memory ("RAM"), may be separate from processor 110 as shown in FIG. 1 or integrated into processor 124 (i.e., on chip memory). The speaker 104 may be a stand-alone speaker or be implemented in the form of headphones (such as that shown in FIG. 1) or other types of head worn listening devices. Further, the processor 110 may be an off-the-shelf device capable of supporting the features described herein or a custom design well within the abilities of one of ordinary skill in the art. Further still, the processor may be implemented as a digital signal processor ("DSP") or as discrete digital logic.

The system 100 preferably comprises a CD audio system which plays audio stored digitally on a CD disk 106. Such audio systems are typically referred to as "players." It should be understood, however, that system 100 is not limited to just audio and may be used to display video and/or text on a display device (not shown). For ease in explaining the preferred embodiments of the invention, system 100 will be referred to throughout this disclosure as a "CD player."

As will be explained in detail below, CD player 100 includes a feature that protects the playback of audio from interruptions caused by mechanical disturbances (jolts, shocks, vibrations, etc.). Although, mechanical disturbances are particularly problematic for portable CD players, mechanical disturbances can also be problematic for non-portable players and thus the scope of the disclosure includes both portable and non-portable players. Accordingly, player 100 may comprise a home-based stereo component, a CD player in an automobile or a battery-operated portable device.

The CD 106 preferably contains compressed digital audio files. Without limitation, in accordance with one preferred embodiment, the digital audio information stored on CD 106 is in accordance with the well-known "MP3" standard. For more information on the MP3 standard and its implementation, the following reference, which is incorporated herein by reference can be consulted: "MP3 and AAC Explained," by Karlheinz Brandenburg, AES 17$^{th}$ International Conference on High Quality Audio Coding, Florence, Italy, Sept. 2–5, 1999.

Referring still to FIG. 2, the CD drive mechanism 102 generally includes a CD loader 118 which operates on a CD disk 106 that is loaded by the user into the player 100. The CD loader 108 functions to move a laser device to a target area of the CD disk 106. The processor 110 includes electrical connections to the CD loader 118 as shown, as well as to memory 124, speaker 104, display 108 and input controls 106. As shown, the processor 110 includes block decode logic 112, an MP3 decoder 114 and file management logic 116. The block decode logic 112 couples to the CD loader 108, the file management logic 118 and memory 124. The MP3 decoder 114 couples to memory 124 and provides output signals which can be played back via speaker 104. The processor 110 specifically and system 100 more generally may include other components besides those shown in FIG. 2. For example, one or more digital-to-analog converters may be included to convert the digital output signals from the MP3 decoder to an analog format for playing through speaker 104. Further, an amplifier may also be included to amplify the audio signals to the speaker 104. These and other components have been omitted from FIG. 2 for sake of clarity in focusing on the preferred embodiment of the invention.

The following explanation describes the process of creating the disk 106. Once the audio data is compressed in accordance with the MP3 standard, the MP3 data is then encoded using a Cross Interleaved Reed-Solomon Code ("CIRC") process. Broadly, the CIRC coding process includes parsing the audio information into smaller blocks of data and then scrambled, delayed, appended with parity bits, and other steps. A more complete explanation of CIRC encoding can be found in U.S. Pat. No. 6,112,324, incorporated herein by reference.

In contrast to conventional audio CDs in which each track is stored in a contiguous portion of the disk and the tracks are arranged end-to-end, each audio file stored on an MP3 disk may be split apart and stored as separate blocks on the disk at non-adjacent locations. Further, the MP3 audio files are not necessarily arranged adjacent one another. Accordingly, in addition to the audio data itself, other information may also be stored on the CD disk to indicate the location of the files on the disk. Such information is generally referred to as "file system information" is CIRC encoded, but preferably not compressed. The file system information includes the address of the beginning of each file on the disk and other information, explained below, necessary for the player to be able to fully retrieve the file.

Once the audio data is compressed and encoded, it is stored on the CD disk 106 in a process typically referred to as "burning." Once burned, the CD disk 106 can be played in player 102. During playback of the CD disk 106, processor 110 coordinates the retrieval of audio data from the disk 106, storage of the data in memory 124, retrieval of the data from memory 124, decompression of the data.

More specifically, the block decoder 112 retrieves the CIRC encoded file system data from the standard location on the disk and then decodes the data to obtain the file system data in usable form. The file system data can be stored in memory or registers (not specifically shown) in the file management logic 116 or stored in memory 106 and retrieved as necessary. As explained above, the file system data includes information about each track on the disk. Such information includes a name (e.g., name of a song), total size of the track (i.e., number of bytes), and the starting address of the track on the disk. In the event the track comprises multiple segregated packets, the track information would also include the size of the first packet, a pointer to the second packet, the size of the second packet, a pointer to the third packet, and so on. The track information is the same as or similar to a linked list data structure, which is well known in the art. Using this information, the processor 110 is able to retrieve the data comprising any requested track.

After the processor has decoded the file system data, the system waits for the user to select a track to play. Any technique for soliciting a track to play by the user is acceptable. For example, the track names from the file system data can be shown by the file management logic 116 on display 108. The user then can use the input controls 106 to scroll through a list of names to select a desired track. The user can select a single track to play or can select a plurality of tracks to play sequentially in a particular order or randomly. Numerous other embodiments of a user interface are possible.

Once the user uses input controls 106 to select one or more tracks for playing information regarding the requested tracks is kept in the file management logic 116. The file management logic 116 then causes the first track to be played by providing the starting address for and size of the first packet comprising the track to the block decode logic 112. In response, the block decode logic 112 causes the loader 108 to access the requested packet from disk 106. The target packet is read from the disk and provided to the block decode logic 112. The block decode logic decodes the CIRC encoded packet to obtain the MP3 encoded data and stores the MP3 encoded packet in a buffer 132 in memory 124. From memory buffer 132, the MP3 decode logic 114 reads the MP3 encoded packet, decompresses the packet and plays the decoded, decompressed audio data through speaker 104. The file management logic 116 provides the packet location and size information regarding the next packet comprising the current track to the block decode logic 112. The block decode logic repeats the retrieval, decoding process and adds the newly decoded data to the buffer 132.

The rate at which data is stored into the buffer 132 can differ from the rate at which data is read out of the buffer. Generally, data is read out of the buffer at the desired play rate of the audio data, but data is stored into the buffer at a faster burst rate meaning data is written to the buffer at a relatively high speed, but in short duration intervals. The block decode logic 112 monitors the capacity of the buffer 132 and tops off the buffer with more decoded data from the disk 106 when possible. By playing audio data that is taken from memory (buffer 132), a mechanical disturbance of the loader 108 does not cause a cessation of audio, as would otherwise be the case if the audio is taken directly from CD 106 without first being buffered. This is because a mechanical disturbance does not interfere in any way with reading data from solid state memory. As such, the playing of a track will not be interrupted.

As described above, the processor 110 buffers data read from the disk and plays the data from the buffer. In that the processor is buffering data in advance of that data being played through the speaker, this process is referred to as "buffering ahead." In accordance with a preferred embodiment of the invention, the processor, not only buffers ahead while playing a file, but the processor also can buffer ahead between files. That is, while a current file is being played through speaker 104, the processor 110 is buffering the next file to be played. In addition, the processor 110 can coordinate the buffering of more than one file at a time into buffer 132.

Figure 3:
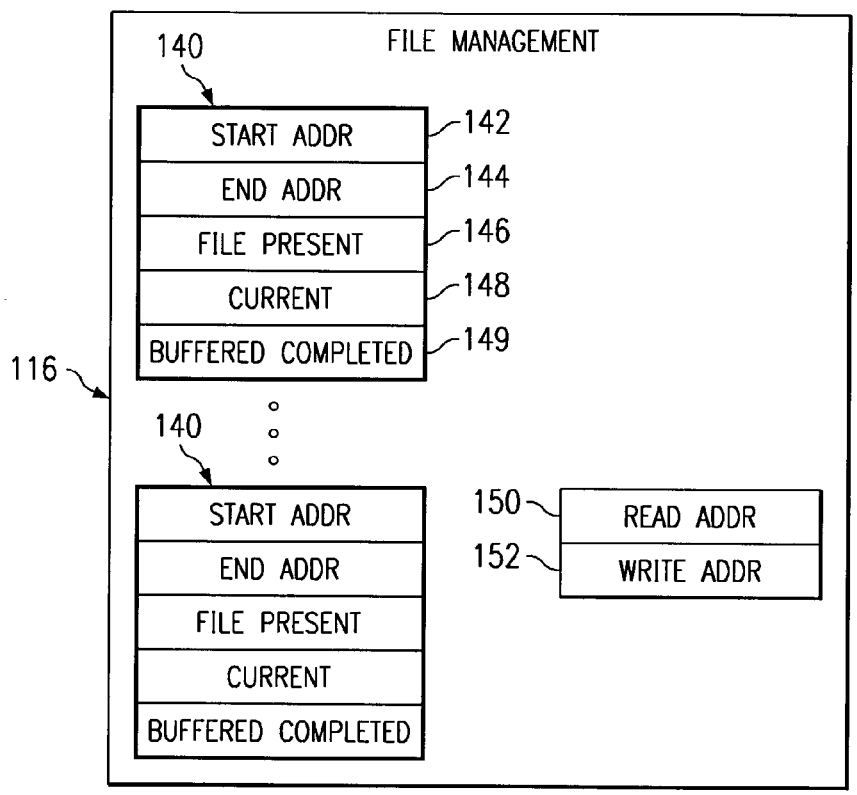
FIG. 3 illustrates logic used to manage multiple files of compressed audio data.

Referring now to FIG. 3, the file management logic 116 preferably includes a set of values 140 that track the location and status of a compressed audio file in buffer 132. File management logic preferably includes a set of values for every file that it can retain in buffer 132. The number of files can be fixed or can be permitted to vary as a function of the number of files the user wishes to play. Each set of values preferably includes a start address 142 representing the address in the memory buffer 132 associated with the beginning of the song and an end address 144 representing the end of the song. The set 140 also includes a pair of flags 146 and 148 which specifies whether the file is actually present in the buffer 132 (flag 146) and whether the file is the file currently being played through speaker 104 (flag 148). Flags 146 and 148 may be implemented as single bits in which a logic "0" indicates one state and a logic "1" indicates the other state. For example, a logic "0" for the file present flag 146 may indicate the file is not present in the buffer, while a logic "1" indicates the file is present. Similarly, a logic "0" for the current flag 148 may indicate the file is not the currently played file, while a logic "1" indicates the file is being currently played. A flag 149 may also be included to indicate whether the file has been completely buffered.

Referring still to FIG. 3, file management logic 116 may also include a read address pointer 150 and a write address pointer 152. The read address pointer 150 represents the location in buffer 132 from where data is currently being taken to play through speaker 104. The write address pointer 152 preferably represents the location in buffer into which data is currently being written from the disk 106.

Figure 4:
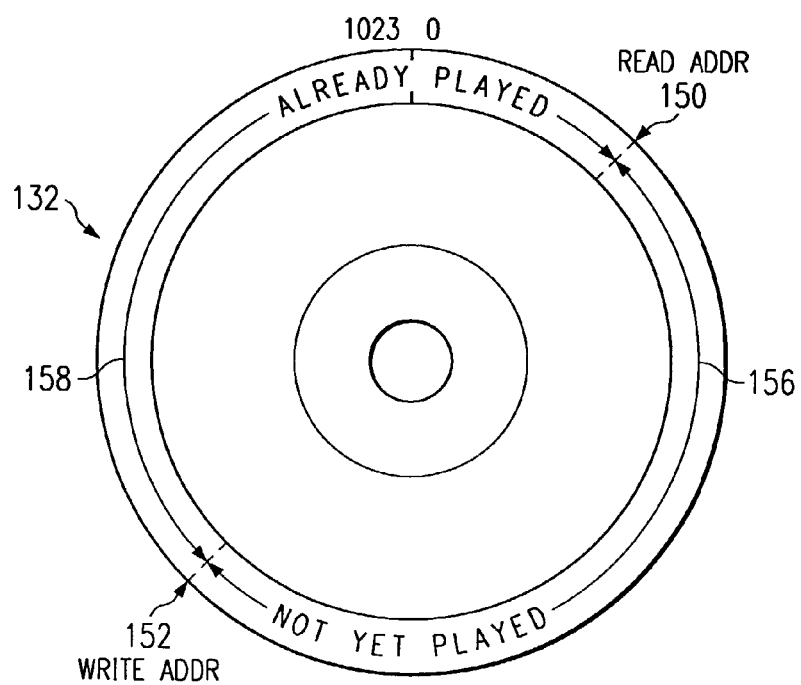
FIG. 4 shows a preferred embodiment of a circular buffer used in accordance with the file management logic of FIG. 3.

Referring now to FIG. 4, the buffer 132 into which compressed audio file data is temporarily written from the disk 106 pending playing through speaker 104 preferably is implemented as a circular buffer as shown. Other buffer structures can be used as well. The circular nature of buffer 132 is illustrated conceptually in FIG. 4. Each addressable location in the buffer has a unique address or offset associated with it. The buffer 132 can be any size desired. In the exemplary embodiment of FIG. 4, the buffer may be a 1 megabyte buffer with addresses ranging from 0 to 1023. Data can be written to, as well as read from, each successive location in the buffer as the address is incremented. Once location 1023 is written to, the next successive address will become address 0 and data thus will be written to the beginning of the buffer. That is, the buffer wraps around itself. Circular buffers are well-known in the art.

The read and write address pointers 150, 152 introduced above with regard to FIG. 3 are also shown in FIG. 4. In general, the read and write address pointers will not be pointing to the same location in circular buffer 132, although they could be coincident if need be. Generally, the player's processor 110 writes to the buffer at locations ahead of the location from which data is being read for playing. Thus, the locations 156 between the read and write address pointers 150 and 152 (in the clockwise direction in FIG. 4) contain data that has not yet been played through speaker 104. Any remaining data 158 in the buffer 132 has already been played.

Figure 5:
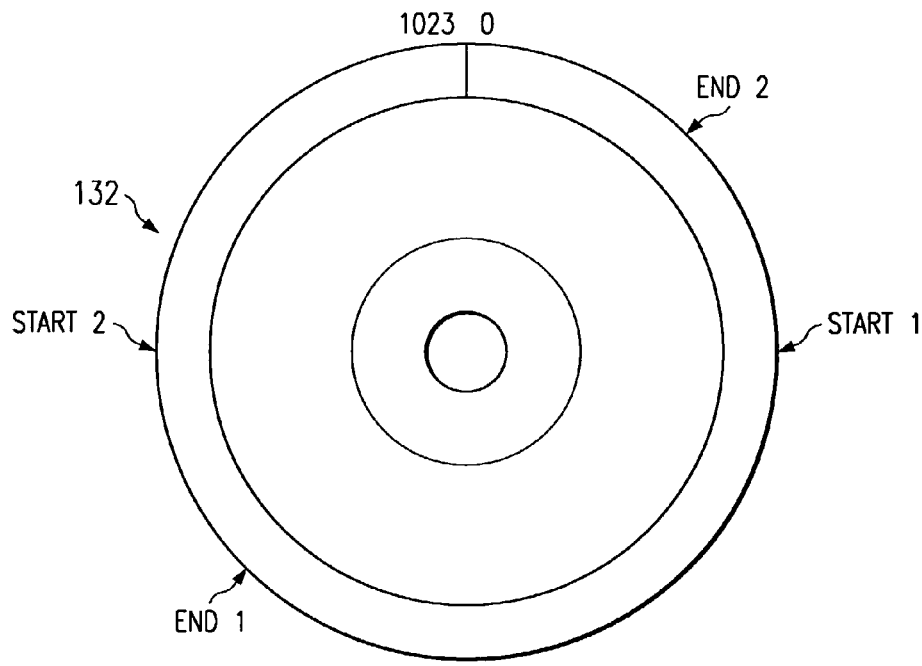
FIG. 5 further illustrates the circular buffer of FIG. 4.

The interaction of the individual file pointers 140 with the circular buffer 132 is shown in FIG. 5. FIG. 5 illustrates the use of the buffer 132 for storing two compressed audio files. A first file has associated with it a start address (START 1) and an end address (END 1). The START 1 address indicates the location in the buffer of the beginning of the first file. A similar pair of start and end pointers are also shown in FIG. 5 for identifying the beginning and ending of a second file. Additional start and end pointers may also be used if additional files are stored in buffer 132. It may be the case, however, that the buffer 132 is not large enough to store even one entire compressed audio file. Thus, in some instances of time, the buffer may only have a start address pointer or an end address pointer, or neither the start nor end of the currently playing file may be contained in the buffer. In this latter case, the start and end address pointers do not indicate a buffer location containing the start or end of the file. Because 0 may be a valid address, and in fact is a valid address in the embodiment of FIG. 5, the set 140 of values (FIG. 3) that track the location and status of a compressed audio file includes the buffered completely flag 149. If this flag is set, then it is known that the associated file has been completely read from the disk and written to the buffer. This means that the end address pointer 144 associated with that file accurately indicates the location of the end of file in the buffer.

The use of the pointers and flags 140 permits efficient management of buffer 132 and, in particular, efficient management of the buffer while buffering multiple compressed audio files. This permits, for example, a user to skip ahead and reverse efficiently and quickly. For example, referring still to FIG. 5, if the second file (i.e., the file associated with the START 2 and END 2 address pointers) is the file currently being played and the user wishes to jump back to the beginning playing at the beginning of the second file or even the beginning of the first file, the player 100 can easily accommodate this because the beginnings of both files are identified via the END2 and END1 address pointers as shown. Controls 106 on the player 100 preferably include reverse button to cause this to happen. Similarly, if the user is playing the first file and wishes to jump ahead to begin playing the second file, the player 100 can readily accommodate that request as well because the buffer contains the beginning of the second file as identified by the START 2 address pointer.

Figure 6:
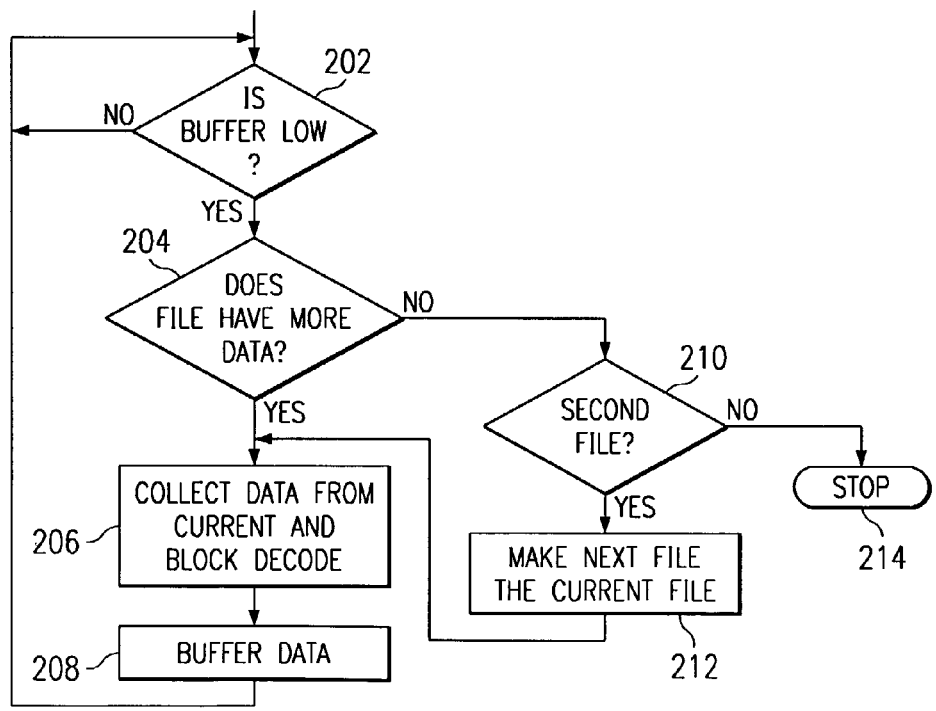
FIG. 6 shows a preferred method of buffering ahead to the next track before the current track completes.

As explained above, the player 100 preferably can buffer ahead the next file to be played while the current file is still playing and, in fact, can buffer ahead multiple songs. This reduces the dead time between files which is characteristic of the prior art. Buffering ahead between songs also reduces the potential for a mechanical disturbance to interrupt the playing of a file. The buffering ahead process is depicted in the flow chart of FIG. 6. This process preferably is performed by processor 110. As explained above, decoded data is stored in buffer 132. In step 202, a determination is made as to whether the buffer 132 is becoming low on data, which eventually will be the case as data is read from the buffer by MP3 decoder 114. The determination as to whether the buffer 132 is becoming low on yet to played audio data preferably is made by the file management logic 116 in accordance with known techniques. One suitable technique includes comparing the value of the write pointer to the read pointer. Referring briefly to FIG. 3, the former pointer would be pointer 152, while the latter pointer would be pointer 150. In general, the "low" buffer condition is when the amount of unplayed data in the buffer falls to a threshold that is preset or programmed via input controls 128. The amount of unplayed data is represented by the difference between these two pointers (area 156 in FIG. 4.) The threshold is large enough that, once the threshold is reached, the block decode logic 112 still has enough time to read more coded data from the disk and store such data into the buffer before the buffer runs dry. It is preferable for the audio to continue playing without interruption.

If it is determined that the buffer is not too low, then control loops back to step 202 and the buffer low condition is repeatedly checked. If, however, the buffer low condition becomes true, then control passes to step 204 in which it is determined whether the file currently being played has more data to be read from the disk 106. The file management logic 116 preferably is used to make this decision by comparing the file system information for the current file being played to the pointer information 140. By examining these values, the file management logic 116 can determine whether any more data exists on the disk for the file to be written to buffer 132. If more audio data exists for the currently playing file, in accordance with step 206 another block of coded data associated with the file is read from the disk 106 and decoded by block decoder 112. The decoded data is then stored in buffer 132 in step 208.

On the other hand, if the determination is made in step 204 that there is no more data on the disk 106 associated with the file that is currently being played from buffer 132, then control passes to decision step 210. In this step, the file management logic 116 preferably determines whether the user has previously designated any more files to be played once the current file finishes playing. As such, this determination is made preferably before the current file finishes playing. If no more files have been designated for playing by the user, then the process stops at 214 and the current file finishes playing.

On the other hand, if another file has been designated by the user for playing after the current file, then control passes to step 212 in which the next file is designated as the "current" file and the processor 110 begins to decode and store the file in buffer 132. This process continues until no more files have been designated for playing by the user or the buffer 132 is full and cannot accomodate any more data.

The preferred embodiment described herein permits intra-file and inter-file buffering to occur. That is, a file can be buffered ahead of its play point and the next file can be buffered while the previous file is still being played. In this way, any mechanical disturbance will not cause a cessation of playing either during or between files. The preferred embodiment also facilitates quick and efficient skipping amoung files on disk 106.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A media player, comprising:
 a processor;
 a media drive mechanism coupled to said processor, said drive mechanism adapted to receive a media device on which a plurality of compressed files of media information is stored, said compressed files being selected by a user for playing;
 memory coupled to said processor; and
 a media output device coupled to said processor through which a media signal is played; and
 wherein said processor is operable to:
  (a) retrieve an initial portion of media data for an initial user specified compressed media file from the media device;
  (b) store the retrieved initial portion as unplayed media data in the memory;
  (c) play unplayed media data from the memory via the media output device;
  (d) manage data in the memory while playing unplayed media data from the memory according to the steps of:
   (1) determining whether the amount of unplayed media data in the memory is below a threshold,
   (2) if the amount of unplayed media data in the memory is not below the threshold, performing step (1) again,
   (3) if the amount of unplayed media data in the memory is below the threshold, determining whether more media data exists for a current compressed media file,
   (4) if more media data exists for the current compressed media file, retrieving a next portion of such data,
   (5) if more media data does not exist for the current compressed media file, determining whether a next user specified compressed media file is available to be buffered, and
   (6) if more media data does not exist for the current compressed media file and a next user specified compressed media file is available, then retrieving an initial portion of media data from the next compressed media file, storing the retrieved initial portion as unplayed media data in the memory, setting the next compressed media file as the current compressed media file and performing step (1) again.

2. The media player of claim 1, wherein said compressed media files comprise audio data and said media output device comprises a speaker.

3. The media player of claim 1 wherein said processor comprises file management logic keeps track of a plurality of media files at least partially buffered in said memory.

4. The media player of claim 3 wherein said file management logic comprises a plurality of sets of pointers, each set associated with a media file and indicative of the location of the media file in said memory.

5. The media player of claim 4 wherein each set of pointers comprises a start address and an end address of the file associated with the pointer set.

6. The media player of claim 5 wherein said set of pointers also comprises a file present flag indicating whether at least a portion of the associated file is present in the memory, a current flag indicating whether the associated file is currently being played and a buffered completely flag indicating whether the associate file has been completely stored in said memory.

7. The media player of claim 4 wherein said memory comprises a circular buffer and said media files are stored in a circular buffer in said memory.

8. The media player of claim 1 wherein said memory comprises a circular buffer and said media files are stored in a circular buffer in said memory.

9. The media player of claim 1 wherein:

said processor causes the playing of the initial media file by recall of said compressed blocks corresponding to the initial media file from said memory, decoding and outputting said recalled compressed blocks, and causes the playing of the initial media file to skip ahead to the next compressed media file, at least some of which is already stored in said memory, in response to a user skip command by recalling, decoding and outputting compressed blocks of data stored in said memory at a beginning of the next compressed media file.

10. The media player of claim 1 wherein:

said processor causes the playing of the initial media file by recall of said compressed blocks corresponding to the initial media file from said memory, decoding and outputting said recalled compressed blocks, and causes the playing of the initial media file to skip back to the beginning of a previous media file which is already stored in said memory, in response to a user reverse command by recalling, decoding and outputting compressed blocks of data stored in said memory at a beginning of the previous media file.

11. The media player of claim 1 wherein said media device comprises a CD.

12. The media player of claim 1 wherein said media device comprises a solid state memory device.

13. A method of playing compressed media files from a storage medium through a memory buffer to an output device, comprising:

(a) retrieving an initial portion of media data for an initial user specified compressed media file from the storage medium;

(b) storing the retrieved initial portion as unplayed media data in the memory buffer;

(c) playing unplayed media data from the memory buffer;

(d) while playing unplayed media data from the memory buffer managing data in the memory buffer according to the steps of:

(1) determining whether the amount of unplayed media data in the memory buffer is below a threshold;

(2) if the amount of unplayed media data in the memory buffer is not below the threshold, performing step (1) again;

(3) if the amount of unplayed media data in the memory buffer is below the threshold, determining whether more media data exists for a current compressed media file;

(4) if more media data exists for the current compressed media file, retrieving a next portion of such data;

(5) if more media data does not exist for the current compressed media file, determining whether a next user specified compressed media file is available to be buffered; and (6) if more media data does not exist for the current compressed media file and a next user specified compressed media file is available, then retrieving an initial portion of media data from the next compressed media file, storing the retrieved initial portion as unplayed media data in the memory buffer, setting the next compressed media file as the current compressed media file and performing step (1) again.

14. The method of claim 13 further comprising:

in response to a user skip command skipping the playing of unplayed media data from the memory buffer to a beginning of unplayed media data of a subsequent compressed media file already stored in said memory buffer.

15. The method of claim 13 further comprising:

in response to a user reverse command reversing the playing of unplayed media data from the memory buffer to a beginning of media data of a previous compressed media file still stored in said memory buffer.

16. A media player, comprising:

a media device on which a plurality of compressed files of media information is stored, one or more of said compressed files being selected by a user for playing;

memory;

a media output device through which a media signal is played;

a means for retrieving an initial portion of media data for an initial user specified compressed media file from the storage medium;

means for storing the retrieved initial portion as unplayed media data in the memory;

means for playing unplayed media data from the memory via the media output device;

means for managing data in the memory while playing unplayed media data from the memory buffer according to the steps of:

(1) determining whether the amount of unplayed media data in the memory is below a threshold;

(2) if the amount of unplayed media data in the memory is not below the threshold, performing step (1) again;

(3) if the amount of unplayed media data in the memory is below the threshold, determining whether more media data exists for a current compressed media file;

(4) if more media data exists for the current compressed media file, retrieving a next portion of such data;

(5) if more media data does not exist for the current compressed media file, determining whether a next user specified compressed media file is available to be buffered; and (6) if more media data does not exist for the current compressed media file and a next user specified compressed media file is available, then retrieving an initial portion of media data from the next compressed media file, storing the retrieved initial portion as unplayed media data in the memory, setting the next compressed media file as the current compressed media file and performing step (1) again.

17. The media player of claim 16 wherein said media device comprises a CD.

18. The media player of claim 16 wherein said media device comprises a solid state memory device.

* * * * *